May 23, 1944. C. H. PETERSON ET AL 2,349,750
METHOD AND APPARATUS FOR FORMING WIRE ENTANGLEMENTS
Filed Feb. 23, 1942 7 Sheets-Sheet 1
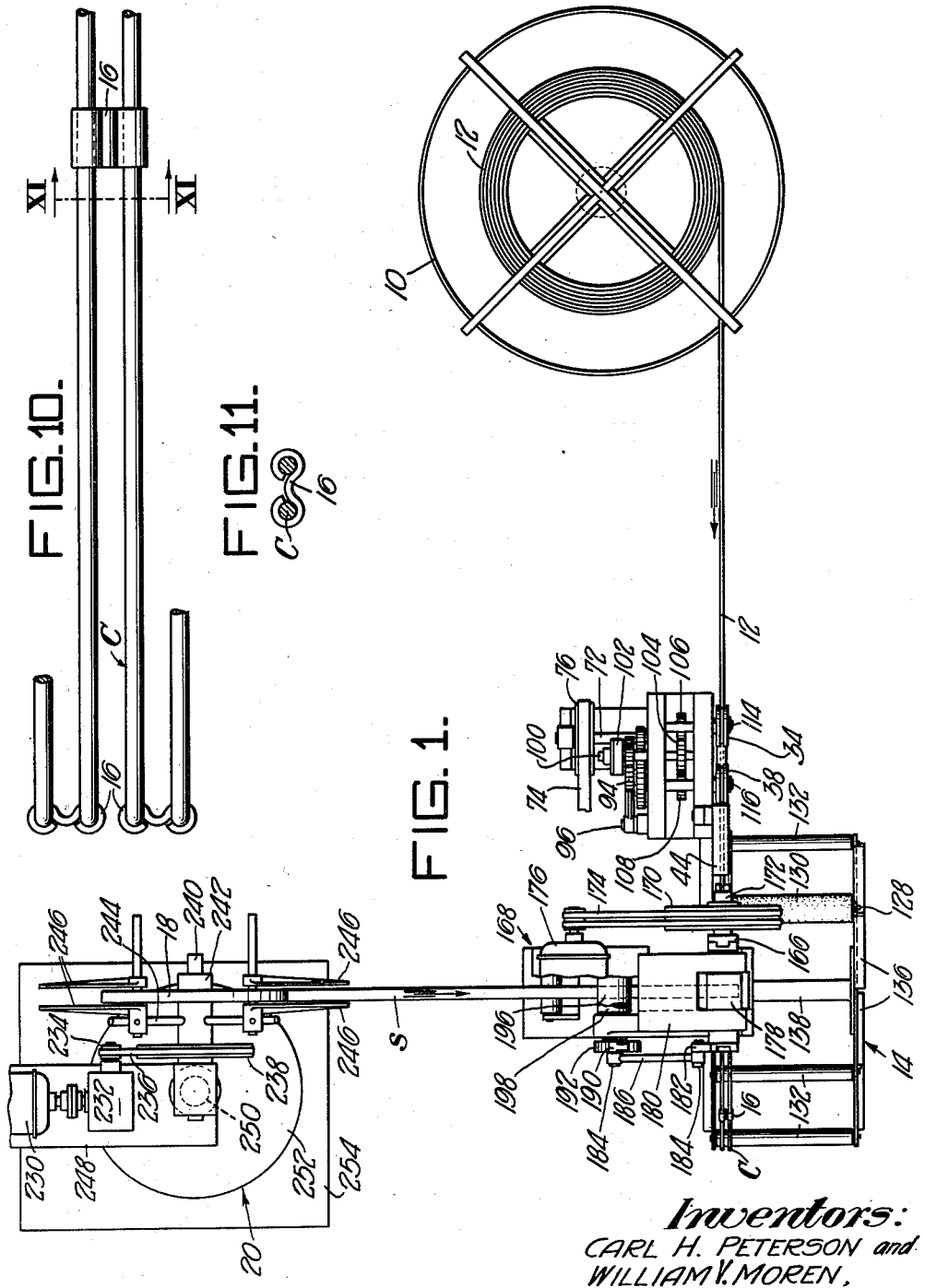
Inventors:
CARL H. PETERSON and
WILLIAM V. MOREN,
by: John E. Jackson
their Attorney.

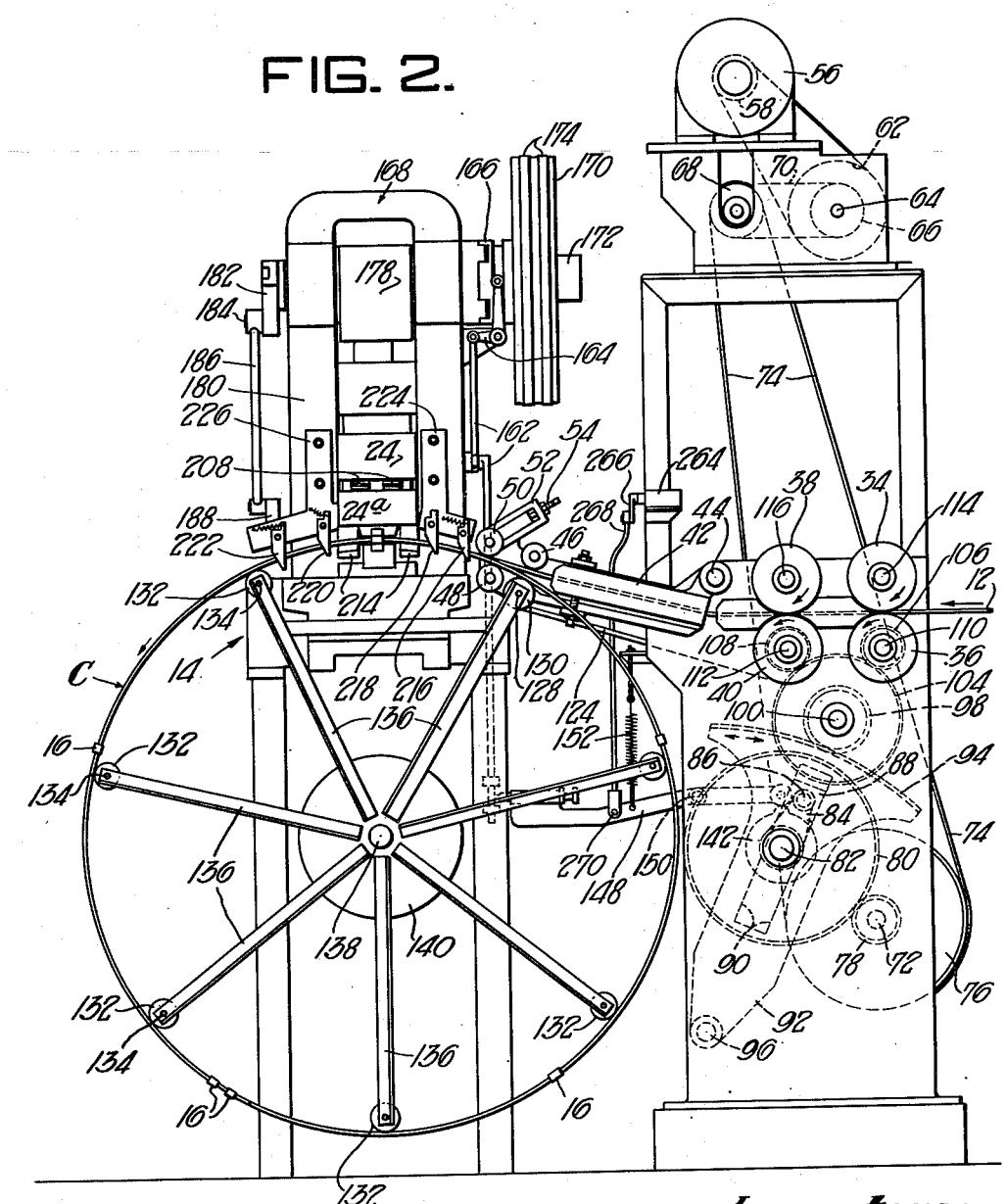

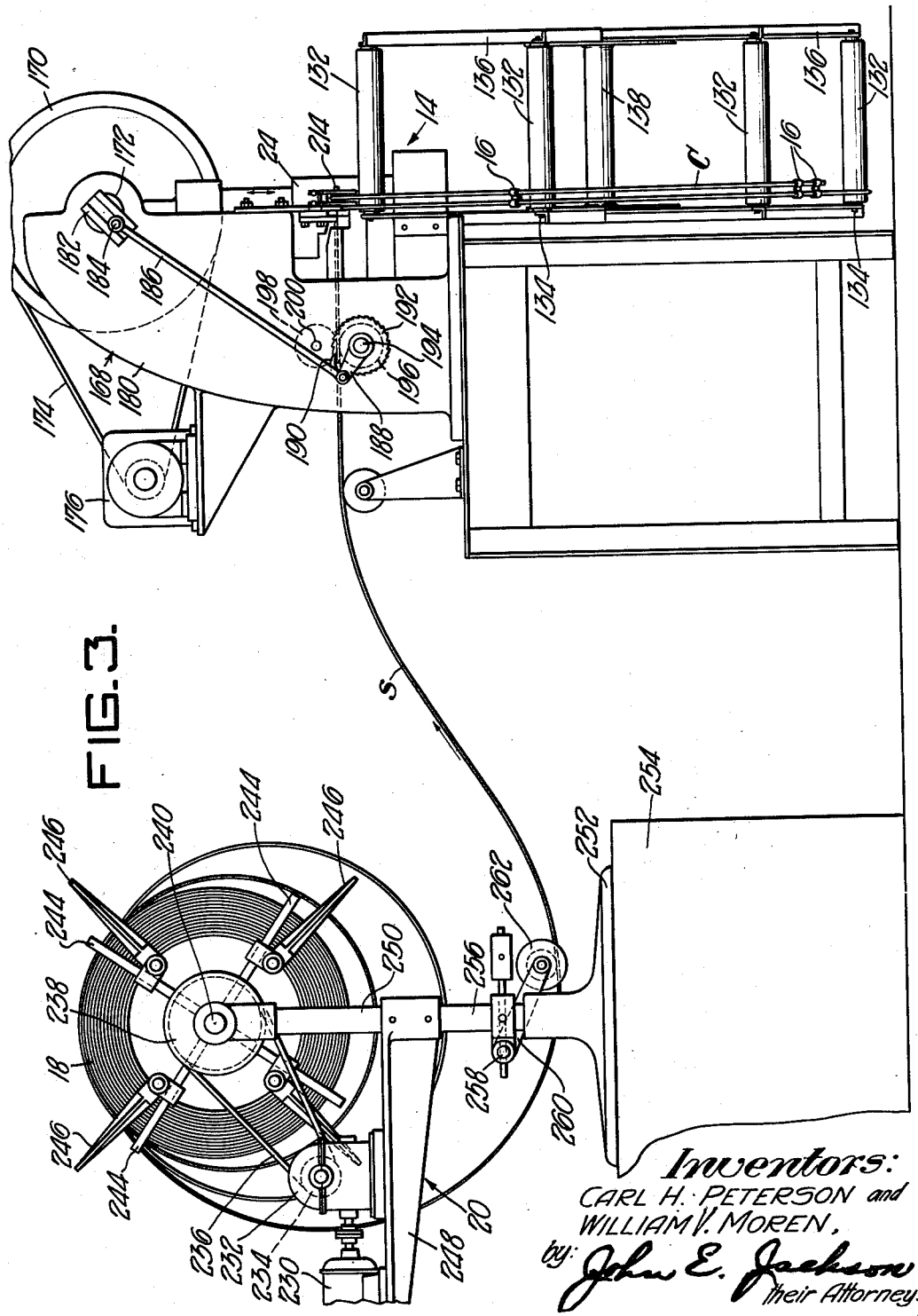

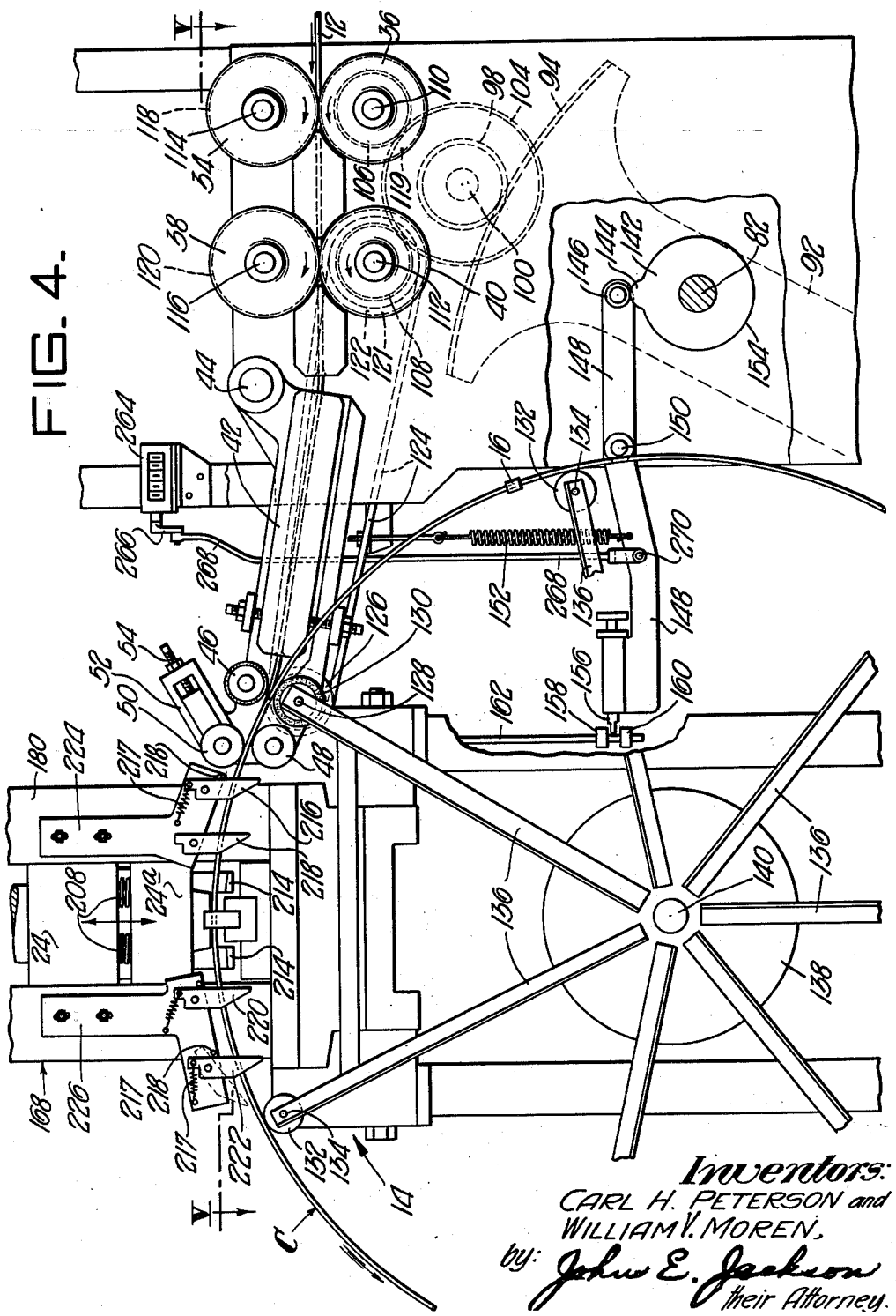

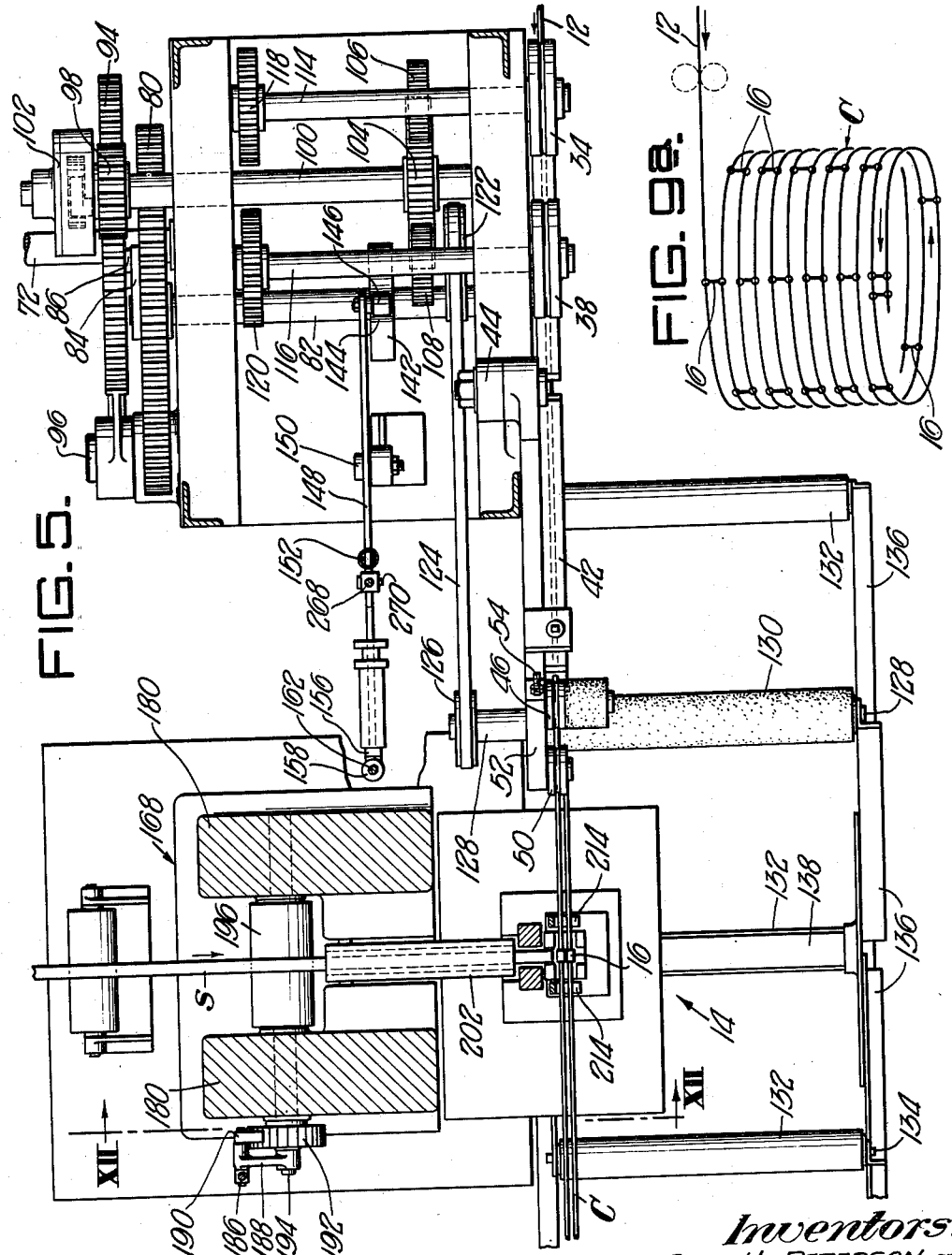

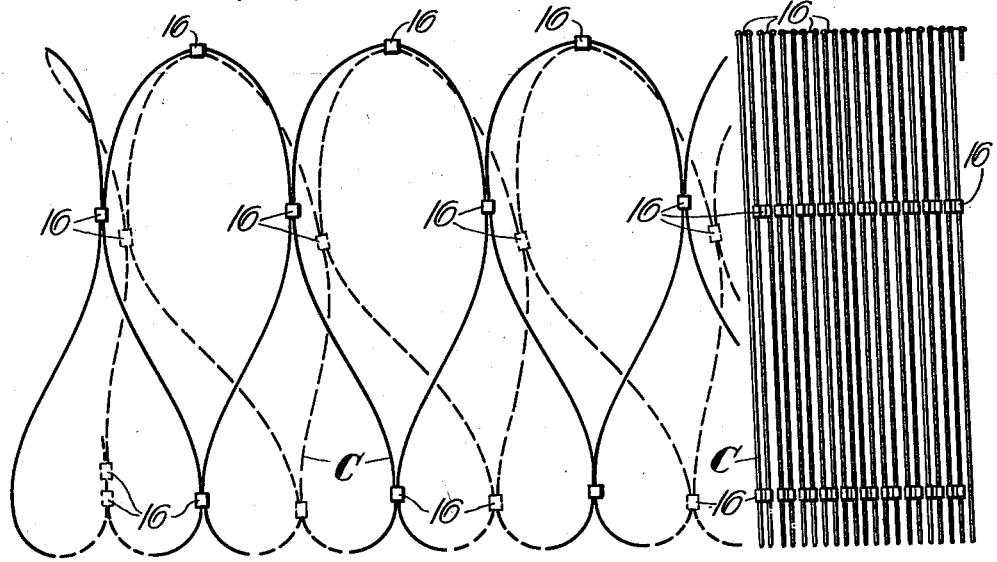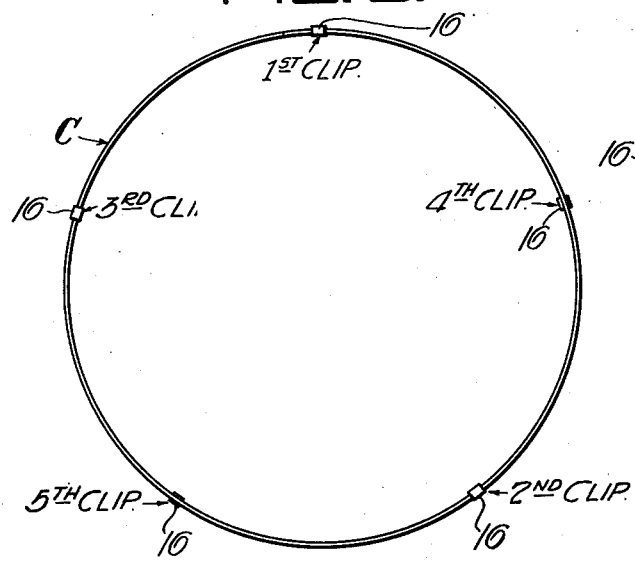

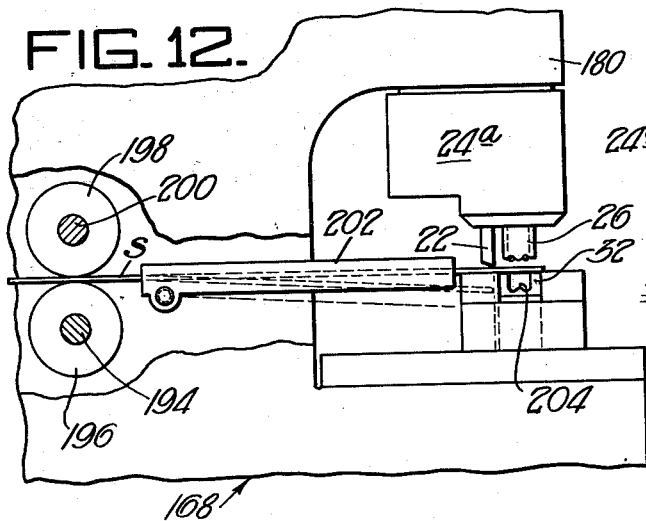
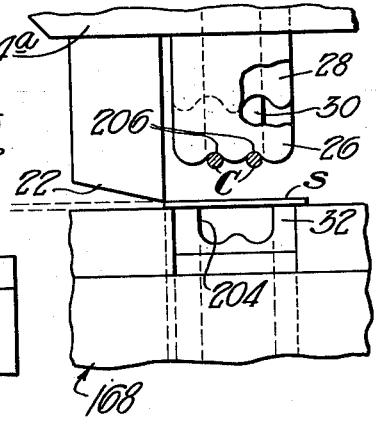
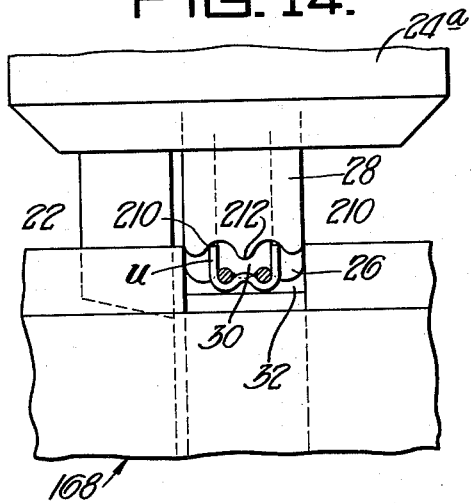
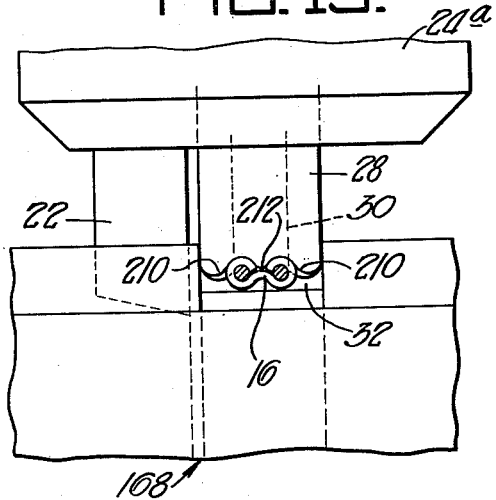

Patented May 23, 1944

2,349,750

UNITED STATES PATENT OFFICE 2,349,750

METHOD AND APPARATUS FOR FORMING WIRE ENTANGLEMENTS

Carl H. Peterson and William V. Moren, Worcester, Mass., assignors to The American Steel and Wire Company of New Jersey, a corporation of New Jersey Application February 23, 1942, Serial No. 432,080

20 Claims. (Cl. 140—3)

The present invention relates to an improved method and apparatus for forming coiled obstacles herein referred to as entanglements adapted to be placed in the path of either horsedrawn or mechanized war machines such as field artillery, tanks, armored cars and like equipment used in modern warfare.

One object of the invention is to provide a method and means for very quickly and inexpensively forming an entanglement in the nature of a collapsed coiled spring-like structure with certain convolutions clipped together in the special manner hereinafter shown and described.

Another object is to provide an efficient mechanism for carrying out the novel method steps hereinafter disclosed and claimed.

In accordance with our invention, wire stock in the bundled form that it customarily comes from a wire or rod mill is rotatably supported on a conventional type of pay-off reel mechanism. From this rotatable support the wire is advanced by power driven feed wheels through a guide and between cooperating forming rolls which are effective to impart a predetermined arcuate curvature to the stock to suit the requirements of the particular size of entanglement being constructed. For example, if the helix is to be of a diameter of approximately 4 feet, the forming rollers bend the wire stock to a 2 feet radius. The thus bent and advancing wire stock is supported by a circular series of freely rotatable cylinders which jointly serve to rotatably support the helix, which is being continually formed. At least one of the cylinders is preferably positively driven at intermittent intervals. During the dwell periods between the intermittent partial rotations imparted to the helix, a supply of flat wire, herein termed clip stock, is fed transversely of the adjacent convolutions and at intervals, a predetermined length of said clip stock is severed, whereupon cooperating dies come into play to form a substantially U-shaped clip, the legs of which straddle adjacent convolutions of the entanglement being formed. Subsequently the legs of the clip are clinched over such convolutions, whereupon partial rotation is given to the helical entanglement and another length of clip stock is fed to position, severed, formed into a clip, and clinched to one of the two adjacent convolutions.

The above and further detailed aspects of the invention will be fully apparent from a consideration of the following disclosure and claims, when read in connection with the accompanying drawings, in which:

Figure 1 is a plan view showing the general layout of apparatus for carrying out the method steps of the present invention;

Figure 2 is a front elevation of Figure 1;

Figure 3 is an elevation from the left of Figure 2;

Figure 4 is an enlarged detail of parts shown in Figure 2 principally illustrating the means for imparting a periodic partial rotation to the wire helix being formed and for guiding the convolutions thereof to the means for applying clips which join such convolutions at predetermined peripherally spaced points;

Figure 5 is a horizontal section on line V—V of Figure 4;

Figure 6 is a view showing an entanglement such as formed by the method and apparatus of the present invention, the same being in the condensed or collapsed condition in which it is formed;

Figure 7 is a view of the same entanglement shown in Figure 6 but illustrating the expanded condition thereof in which it is intended to be used to hamper advancing war equipment;

Figure 8 is an end view of Figure 6;

Figures 9 and 9ª are diagrammatic perspective views illustrating the manner of staggering the clips along the length of the helix constituting the main portion of the entanglement;

Figure 10 is a fragmentary view on an enlarged scale showing in detail the manner of attachment of adjacent convolutions of the wire helix;

Figure 11 is a section on line XI—XI of Figure 10;

Figure 12 is a section on line XII—XII of Figure 5 with parts broken away and with parts omitted in the interest of clearness;

Figure 13 is an enlarged view of parts shown in Figure 12; and

Figures 14 and 15 are fragmentary detail views illustrating other portions of certain parts shown in Figure 12.

Referring in detail to the drawings, the numeral 10 represents a reel carrying a bundle or other convenient supply of rod or wire stock 12 which, according to the present invention, is led to a helix forming station 14 where it is formed into a helical coil C with the convolutions thereof secured together at staggered locations, as shown in Figures 6, 8, 9 and 9ª.

Means are provided at the station 14 for periodically rotating the convolutions of the helical coil C a predetermined fraction of a revolution, whereupon the coiling motion is interrupted or dwells for a short interval. During each dwell interval an attaching clip 16, such as shown in Figures 10 and 11, is secured to two adjacent convolutions of the coil.

The clips 16 are formed of flat wire, herein referred to as "clip stock," which is fed from a supply reel 18 located at a clip stock supply station indicated generally at 20. At the station 14 a predetermined length of the clip stock is severed by a reciprocating knife 22 (see Figures 12 and 13) upon the down stroke of a vertically reciprocating head 24. The head carries a plurality of male die elements 26, 28 and 30, which coact with the fixed female die member 32. The member 30 is located between and is slidable relative to the members 26 and 28. The parts are so constructed and operated that after a short length of clip stock has been severed by the knife 22, the head 24 will descend, for example, from the position shown in Figure 13 toward the position shown in Figure 14. During this movement the die members 26 and 28 will force the convolutions down, which in turn will push the severed length of clip stock into the cavity of die member 32, thus transforming the severed length of stock into the substantially U-shaped clip shown in Figure 14. Further downward movement of the die element 30 will cause the free ends of the clip stock to be clinched over the adjacent convolutions of the wire helix. In other words, the U-shaped clip will be transformed from the shape shown in Figure 14 to the clinched form shown in Figures 11 and 15. This entire severing of the clip stock and the forming of the clip and clinching of it to adjacent convolutions is accomplished during the short dwell interval of the intermittent rotary movement of the wire helix.

The various component parts of the mechanism are so related and coordinated that they apply the clips in a predetermined staggered relation to the convolutions of the helix, as will be apparent from examination of Figures 6 and 9. This staggering of the points at which the convolutions are united by the clips involves a problem peculiar to the formation of the ultimate entanglement such as shown in Figure 7. In order to bring about this staggering manner of attachment, we have devised the special novel mechanism herein shown and described and constituting one phase of the invention.

It is essential to provide the staggered arrangement of the clips so that when the entanglement is transformed from the collapsed and coiled condition shown in Figures 6 and 9 to the expanded condition shown in Figure 7, the portions between the clips, as viewed in plan, resemble a series of lozenge-shaped figures. Thus, what originally were substantially parallel portions of a convoluted helical wire become converging entanglement portions, it being apparent from Figure 7 that the increments of each convolution between the clips converge toward adjacent clips in the expanded condition of Figure 7. Such converging portions of the expanded structure form a very effective entanglement, since moving objects tend to wedge themselves within the portions of the wire near the apexes of the lozenge portions. Thus the product resulting from the practice of the invention provides a very effective device for snaring oncoming motorized artillery and will also provide a formidable obstacle to harass either cavalry or infantry.

In order to secure the attaching clips according to the desired staggered pattern along the length of the helix, we preferably coil the helix of metal wire in such manner that its convolutions are of substantially uniform diameter. We then secure clips around two adjacent convolutions, for example, as shown in Figure 11. The helix is then turned a predetermined fraction of a revolution, whereupon a second clip is secured to the convolutions. Thereafter we similarly repeat the clip attaching step and fractional rotation of the helix to clip together the several convolutions at a multiplicity of predetermined circularly spaced locations. In carrying out this method of attaching the clips in the desired staggered relationship to form the lozenge-shaped entangling portions in the finished product, it is important that an orderly predetermined sequence of operations be followed.

While not limited thereto, it is convenient for purpose of description to consider the circle of the helix to be divided into five equal parts. For example, as shown in Figure 8 the first clip will be clinched or otherwise permanently secured to two adjacent convolutions at the point marked "first clip." The wire helix will then be turned about its axis two-fifths of a revolution, whereupon another clip will be applied. This is marked "second clip" in Figure 8. At the next stage the helix will be turned two-fifths of a revolution and the third clip applied. This is marked "third clip" in Figure 8. Upon the next two-fifths of a revolution a fourth clip will be applied to an alternate pair of convolutions of the helix. Since the helix has thus been turned through one and one-fifths revolution, the fourth clip will thus be located midway between the first clip and the second clip. Thereafter the helix will again be rotated two-fifths of a revolution and a fifth clip will be applied midway between the second clip and the third clip. Upon the next feeding movement of the helix the sixth clip will be applied practically in line with the first clip shown in Figure 8.

Thus the alternate pairs of convolutions will be clipped together in the staggered fashion illustrated in Figures 6 and 9 so as to permit of the lozenge formation substantially as pictured in the expanded condition of Figure 7. In order to form the helix and to properly apply the clips in the staggered manner required to produce the specific entanglement shown and described by way of example, we provide means for periodically advancing an amount of wire stock from the supply bundle 12 at each intermittent feeding stroke equal to two-fifths of the circumference of a circle which would circumscribe the helix to be formed. During this feeding movement the wire is subjected to a bending action so as to impart the necessary arcuate form to each two-fifth increment as it is advanced. The forward feed of the wire is effected by two pairs of grooved feed rollers 34, 36, 38 and 40 shown in Figures 2 and 4. They exert sufficient friction grip on the wire to withdraw it from the bundle 12 and advance it through a passageway in an adjustable guide member 42 which is pivoted at 44. From the guide member the wire is fed into the zone of influence of three rollers 46, 48 and 50, which are so positioned with relation to one another as to impart an arcuate form to the wire. The roller 50 is adjustably mounted in a housing 52, and adjusting means 54 are provided whereby its position can be varied so as to impart to the wire an arcuate bend of predetermined magnitude. Thus, by varying the position of the roller 50 the apparatus can be made effective to coil helixes of different diameters.

The feed rollers 34 through 40 and the forming rollers 46 through 50 are intermittently driven from a constantly rotating motor 56 which carries a pulley 58 connected by a belt 60 with a pulley 62 on a shaft 64 which in turn carries a pulley 66 which transmits motion to a pulley 68 through a belt 70. From the pulley 68 power is transmitted to a shaft 72 through belt 74 and pulley 76. The shaft 72 carries a driving pinion 78 which meshes with a gear 80 on a shaft 82. This shaft has secured thereto a crank arm 84 which carries a crankpin 86 engaging a slide block 88 which works in a guideway slot 90 formed in the radial arm 92 of a gear segment 94 which is pivotally supported on a fixed stud 96. The gear segment meshes with a pinion 98 so mounted that it is free to turn in one direction on a shaft 100. The shaft 100 carries a one-way clutch 102 which is so constructed and arranged that when the segment 94 moves counter-clockwise on its forward stroke (as viewed in Figure 2) and consequently turns the gear 98 clockwise, the shaft 100 will be turned clockwise. At the same time a gear 104 secured to the shaft 100 will be turned clockwise. This will impart counterclockwise rotation to gears 106 and 108 secured to the respective shafts 110 and 112 which carry the lower wire feed wheels 36 and 40.

Shafts 114 and 116 which support the feed rollers 34 and 38 carry gears 118 and 120 which mesh with the gears 119 and 121 on shafts 110 and 112, respectively. The wire feed mechanism above described is so arranged that as the segment 94 moves forward (counterclockwise in Figure 2), the feed rollers 34, 36, 38 and 40 will be turned in the directions indicated by the arrows so as to feed the wire 12 forward a distance corresponding to two-fifths of the circumference of the helix C. It will be understood that the forward counterclockwise motion of the segment is effected by the throw of the crankpin 86. During the forward motion of the segment the clutch 102 is active and motion is transmitted from the shaft 100 to the gear 98. On the backward stroke of the segment 94 (clockwise stroke in Figure 2), the clutch is passive, that is, it slips and thus permits the gear 98 to turn freely on the shaft 100. Hence no backward motion is imparted to the shaft 100 nor is any motion imparted to the feed rollers 34, 36, 38 and 40 during such back stroke. During the back stroke of the segment it is therefore apparent that there is a dwell period during which the helix does not turn. During this dwell period mechanism to be presently described comes into play to sever a length of the clip stock and form it into substantial U-shape, which clip in turn is clinched onto adjacent convolutions of the wire helix.

Means are also provided for rotatably supporting the wire helix being formed and clipped, this supporting coacting with the means which intermittently turn the helix two-fifths of a revolution upon each forward stroke of the segment 94 and also coacting with feed fingers hereinafter described which serve to push the intermittently accumulating helix longitudinally outward on the freely rotatable supports 132 to be presently described.

The drive for intermittently turning the wire helix includes a pulley 122 mounted on the shaft 112 which is connected by a belt 124 with a pulley 126 mounted on a shaft 128. which carries a roller 130 faced with rubber or other friction material so as to exert sufficient traction on the wire helix to positively rotate the same a predetermined fraction of a revolution upon each forward stroke of the segment 94.

At a plurality of equally spaced points within the circumference of the wire helix being coiled, a number of supporting cylinders 132 are provided which are freely rotatable on respective trunnions 134 journaled in the outer extremities of fixed spider arms 136, whose inner portions are secured to a hub 138 carried by a fixed supporting bar 140. As thus arranged it will be apparent that as the wire 12 is intermittently advanced, a substantially helical coil, such as shown in Figure 6, builds up or gradually accumulates around the several cylinders 132. As the operation proceeds, the completed collapsed helical entanglement, with the many convolutions clipped to one another at staggered intervals, is fed longitudinally of the supporting cylinders 132 which jointly constitute a take-up device for accommodating the intermittently accumulated helical wire entanglement.

During each dwell period, while the segment 94 is making its back stroke, a complete cycle of operation takes place at the clip forming station 14. This coordination is accomplished through the operation of a cam 142 carried by the shaft 82. This cam has a rise 144 effective to lift a cam follower 146 secured to the outer end of a lever 148 pivoted at 150 to the position of Figure 4 against the action of a tension spring 152 which normally tends to hold the cam follower in contact with the circular dwell portion 154 of the cam. At its forward end the lever 148 carries a manually retractable finger 156 which works in the annulus between collars 158 and 160 secured to a vertically slidable rod 162.

When the finger 156 is manually retracted, the automatic coordination of operations is rendered ineffective. Thus the operator can manually control the locations at which clips may be applied for special purposes, or the orderly staggering may be deliberately varied at times to suit the particular needs of the type of entanglement used in different terrains. For most purposes the automatic control will be desirable and the finger 156 will normally be in position to actuate the rod 162.

When the rise 144 on the cam depresses the forward end of the lever 148, a downward impulse will be transmitted to the rod 162 which is effective to trip a bell crank lever 164 which serves to actuate a one-revolution clutch 166 of the clip forming punch press indicated as a whole at 168. This one-revolution clutch and the main operating parts of the punch press are of conventional design and therefore need not be illustrated or described in detail. Suffice it to say that the press includes the usual flywheel 170 which normally rotates freely on the shaft 172 of the press. The flywheel is constantly driven by a belt 174 trained over a motor 176 and when the clutch lever 164 is tripped the shaft 172 makes one complete revolution. This shaft carries a conventional form of cam or eccentric 178 which is suitably connected to the aforesaid reciprocating head 24 which is slidable in guides formed in or secured to the frame 180 of the press.

The shaft 172 (Figures 3 and 12) at one extremity carries a member 182 having a crankpin 184 adjustably mounted therein. A pitman 186 transmits motion from the crankpin to a lever 188 carrying a pawl 190 which coacts with a ratchet 192 secured to a shaft 194 which carries a clip stock feed roll 196. Immediately above the feed roll 196 there is a coacting roll 198 mounted on a shaft 200. The arrangement is such that for each revolution of the shaft 172 the rolls 196 and 198 advance a sufficient length of clip stock s from the supply reel through a guide 202 to form one substantially U-shaped clip such as shown at u in Figure 14. After the requisite length of clip stock has been advanced and the head 24 descends, the knife 22 carried thereby shears off a short length of clip stock as indicated in Figure 13. Continued downward movement of the head 24 forces the main die member 26 from the position of Figure 13 to the position of Figure 14. During this movement the severed length of clip stock shown in Figure 13 is forced into the cavity 204 of the lower portion of the die 32 by the two male members 26 and 28, which are slidable relative to the inner male die member 30 located between them. The members 26 and 28 move in unison with the upper portion of the head 24 and they thus partake of the full stroke of the actuating cam or eccentric which reciprocates the head. The die member 30 is secured to a head member 24ᵃ which moves relative to the head 24, this relative movement being permitted by the compression springs 208 interposed between the head members 24 and 24ᵃ. As the die members 26 and 28 move down, they carry with them two adjacent convolutions of the wire helix. Thus the male members 26 and 28, in cooperation with the cavity in the fixed female die 32, form a substantially U-shaped clip of the configuration shown in Figure 14.

Continued downward movement of the head 24 will force down the central or inner male die member 30, whereupon the cam-like outer wings 210—210 thereof in cooperation with the central wedge-like extension 212 thereof will bend the upper extremities of the U-like clip stock of Figure 14 inwardly and downwardly so as to thus curl them over the adjacent convolutions of the wire, thus firmly clinching the two legs of the clip to said convolutions. Thus it is apparent that upon the completion of the downward stroke of the head 24 the severed length of clip stock will be firmly fastened to the two adjacent convolutions of the helix. Upon the up stroke of the head 24 stripper fingers or prongs 214 disposed upon the underside of the convolutions will serve to lift the thus united convolutions upwardly and out of the cavity 204 of the female die. This completes one clip forming and attaching cycle. Thereafter, as the segment 94 again moves forward, another length of clip stock will be severed and the helix will be turned through two-fifths of a revolution and another clip attaching operation will be performed. Since the convolutions previously clipped together are portions of a helix, the completed entanglement will be fed longitudinally of the supporting cylinders 132 with a screw-like action by coaction with a plurality of feed fingers 216, 218, 220 and 222, some of which project between the adjacent convolutions of the helix. These feed fingers are mounted on respective pivot pins, as best shown in Figure 4, which are secured to adjustably mounted brackets 224 and 226. The fingers 216 through 222 act in a manner analogous to a nut in coaction with the screw-like helical convolutions. Thus the turning movement of the helix feeds the completed entanglement longitudinally outward upon the supporting cylinders 132. Suitable springs 217 are provided to impositively hold the fingers against stop pins 228, this yielding spring arrangement being provided so as to permit the fingers to yield when a previously attached clip C comes in contact therewith. The fingers will merely snap back to the position shown in Figure 4 after each clip passes them. In other words, the fingers which are normally in the path of movement of the clips have a guiding and feeding function which is effective to properly direct the incoming wire to the space between the upwardly extended legs of the U-like clip and also to advance the accumulating portions of the helix longitudinally of the rotatable supporting cylinders 132 carried on the outer ends of the fixed spider arms.

The clip stock supply reel 18 is preferably driven by an individual electric motor 230 through suitable gear reduction 232 which drives a pulley 234 connected by a belt 236 to a pulley 238 secured to a shaft 240 which carries a hub 242 from which radiates a plurality of spider arms 244 having adjustable extensions 246 which serve to confine the coiled clip stock on the supply reel 18.

The motor 230 and gear reduction 232 are mounted on a bracket 248 carried by a standard 250 supported on a suitable base 252 mounted on a foundation 254. A collar 256 secured to the upright 250 has a rearward extension forming a pivotal support 258 with an arm 260 which at its outer end carries a feeler roller 262 which rides on the clip stock. This feeler roller is effective to operate a control switch of known construction for periodically energizing the motor 230 whenever the roller reaches a predetermined position. By this means the relatively heavy reel of stock is periodically turned a fraction of a revolution. The mechanism is effective to maintain a sufficient amount of slack on the pay-off end of the reel of clip stock to relieve the feed rollers 196 and 198 of the work of turning the relatively heavy reel. Thus the feed rollers can function to accurately advance the exact amount of stock necessary to form the clip C at each stroke of the head of the punch press.

For convenience in determining the output of the machine as reflected by the number of clips applied, we provide a counter 264 (Figure 4), the actuating arm 266 of which is connected by a link 268 with a pin 270 making a pivotal connection with the lever 148. It is clear that for each stroke of the segment 94 an impulse will be given to the counter, thus visually indicating the number of clips consecutively applied to the helix in staggered relation as hereinbefore disclosed.

From the foregoing it is manifest that our invention provides an improved method and means for applying clips to circumferentially spaced portions of a helical entanglement, the clips being so staggered along the helix that when the helix is expanded or extended, a plurality of helically disposed lozenge-shaped wire figures will result. The thus configured wire entanglement constitutes an effective hazard for either motor driven or animal drawn pieces of war equipment.

If desired, the clips can be either welded or manually applied in the staggered manner set forth. Thus the method of producing the entanglement is not limited to the use of the machine disclosed. But in the interest of speed and economy in manufacture it is highly desirable to utilize the improved automatic mechanism including the various instrumentalities which we have coordinated in the novel combination set forth to perform the sequence of operations hereinbefore set forth in detail.

It is to be understood that the descriptive matter which refers to turning the helix two-fifths of a revolution for each stroke of the segment which drives the feed wheels is to be regarded as illustrative rather than limiting. Instead of advancing the wire stock in two-fifth increments we may, for example, advance the helix two-sevenths of a revolution at each stroke of the segment gear 94 or may select some other odd fractional rotation, the important feature being to so rotate the helix in intermittent increments that a staggering arrangement of the clips will be present so as to transform the convolutions into a multiplicity of lozenge-shaped portions when the thus united helical convolutions are subsequently expanded or extended.

While we have described quite specifically a preferred sequence of operations and have disclosed in considerable detail a specific apparatus for carrying out such operations, it is not to be construed that we are limited thereto since various modifications and substitutions of equivalents may be made by those skilled in the art without departure from the invention as defined in the appended claims.

We claim:

1. The method of making wire entanglements adapted to be axially expanded, which comprises forming a helix of wire and independently joining juxtaposed convolutions to one another at a multiplicity of predetermined circularly spaced locations by independent joints staggered along the helix as said juxtaposed convolutions are being formed.

2. The method of making entanglements adapted to be axially expanded, which comprises coiling a continuous length of wire in intermittent stages in such manner that the convolutions thereof lie closely adjacent, and during the dwell periods between said stages individually joining the several juxtaposed convolutions to one another by independent joints in staggered relation as said juxtaposed convolutions are being formed.

3. The method of making entanglements which comprises forming a helix of metal wire with the convolutions thereof of substantially uniform diameter, securing at least one clip to two adjacent convolutions, forming an additional convolution as a continuation of those previously formed, the helix being turned through a predetermined angle about its axis during the forming operation, securing the last formed convolution to its adjacent convolution by a clip and similarly repeating the forming and fractional rotation of the helix and clip attaching step to thus clip together the several convolutions at a multiplicity of predetermined circularly spaced and independently expansible locations.

4. The method of making entanglements which comprises forming in separate equal arcuate increments a helix of metal wire with the convolutions thereof of substantially uniform diameter, securing one clip to two adjacent convolutions after each angular increment is formed, then securing at least one more clip to the same two adjacent convolutions, forming a third convolution in separate equal increments, and attaching clips to the one of the first-named convolutions next adjacent said third convolution and to said third convolution at points intermediate the locations at which the first mentioned clips were attached to the first two convolutions mentioned.

5. The method of making entanglements which comprises forming in separate equal arcuate increments a helix of metal wire with the convolutions thereof of substantially uniform diameter, securing one clip to two adjacent convolutions after each angular increment is formed, then securing at least one more clip to the same two adjacent convolutions, forming a third convolution in separate equal increments, attaching clips to the one of the first-named convolutions next adjacent said third convolution and to said third convolution at points intermediate the locations at which the first mentioned clips were attached to the first two convolutions mentioned, and repeating the aforesaid steps in like manner until an entanglement of desired extent is fabricated.

6. The method of making entanglements which comprises forming in separate equal arcuate increments a helix of metal wire with the convolutions thereof of substantially uniform diameter, securing one clip to two adjacent convolutions after each angular increment is formed, then securing at least one more clip to the same two adjacent convolutions, forming a third convolution in separate equal increments, attaching clips to the one of the first-named convolutions next adjacent said third convolution and to said third convolution at points intermediate the locations at which the first mentioned clips were attached to the first two convolutions mentioned, the peripheral length of the arcuate increments being equal to the length of periphery of the circle which would enclose the helix divided by an unequal number.

7. The method of making entanglements which comprises forming convolutions of wire in continuous coiled juxtaposition alongside one another, feeding clip stock transversely thereto, periodically severing the stock and forming clips therefrom, and clinching respective clips to adjacent convolutions at predetermined substantially equally spaced locations as said juxtaposed convolutions are being formed, so that when the entanglement is expanded the said convolutions will be so bent as to form a series of lozenge-shaped figures.

8. The method of making entanglements which comprises intermittently forming arcuate convolutions of wire in coiled juxtaposition alongside one another, feeding a strip of clip stock transversely thereto, severing said stock periodically and forming U-shaped clips therefrom in such manner that adjacent convolutions are straddled thereby at predetermined locations, clinching respective clips to said convolutions, forming an additional convolution as a continuation of those previously formed, turning the thus assembled structure during the said forming operation, and repeating the aforesaid helix forming, turning, stock feeding, clip forming and clip clinching steps.

9. The method of making entanglements which comprises forming a helix of wire with the convolutions in close proximity, feeding a strip of clip stock axially of said helix, severing a portion of said clip stock, bending the extremities of the severed portion to form a U-shaped clip whose legs straddle adjacent convolutions of said helix, clinching the extremities of said clip legs around adjacent convolutions, forming a fractional convolution as a continuation of convolutions previously formed, turning said helix for each said predetermined fraction of a revolution, then severing another portion from said strip and forming another U-shaped clip, clinching said second mentioned clip to the juxtaposed convolutions, then periodically repeating such helix forming, turning, stock feeding, severing, clip forming and clinching operations after each fractional revolution of said helix to thus clip together the convolutions at a multiplicity of predetermined substantially equally spaced locations.

10. Apparatus of the character described comprising means for supporting a supply of wire, means for forming a helical coil from wire fed therefrom, means supporting a supply of clip stock, means for feeding the clip stock transversely across two adjacent convolutions of the wire helix, means for severing the clip stock so fed, and means for clinching the severed clip stock about said adjacent convolutions of the helix.

11. Apparatus of the character described comprising pay-off means for supporting a supply of wire, means for forming a helical coil therefrom, means for periodically imparting a turning motion to said helical coil, spaced rotatable means jointly supporting the coil with freedom for said turning motion, means supporting a supply of clip stock, feed means for periodically advancing a predetermined length of said stock, means for periodically severing each said length and forming a U-shaped clip therefrom, and means for clinching each said clip to juxtaposed convolutions of said helical coil.

12. Apparatus of the character described comprising pay-off means for supporting a supply of wire, means for forming a helical coil therefrom, means for periodically imparting a turning motion to said helical coil, spaced rotatable means jointly supporting the coil with freedom for said turning motion, means supporting a supply of clip stock, feed means for periodically advancing a predetermined length of said stock, means for periodically severing each said length and forming a U-shaped clip therefrom, means for clinching each said clip to juxtaposed convolutions of said helical coil, and mechanism coordinating the movements of said feed means, said clip forming means and said clinching means, with the dwell periods intervening between said turning movements of the helical coil.

13. Apparatus of the character described comprising means rotatably supporting a supply of wire, feed wheels for withdrawing wire therefrom, a plurality of coacting rolls effective to bend the wire to arcuate form as it is fed forward between the feed wheels, a plurality of circularly arranged cylinders freely rotatable about fixed axes and adapted to support convolutions of a helix of wire formed by the feed wheels and bending rolls, means for positively driving at least one of said cylinders intermittently so as to periodically rotate the helix of wire formed by the aforesaid parts a predetermined fraction of a revolution, means for periodically forming U-shaped clips, and means for periodically clinching said clips to adjacent convolutions of the helix.

14. In a machine of the character described, a supply of wire stock, a plurality of circularly disposed cylinders rotatable about fixed axes, feed wheels and forming rollers effective to form a wire helix about said cylinders, means for positively driving one of said cylinders at intermittent time intervals so as to impart fractional rotation of the wire helix at such intervals, means for supporting a supply of clip stock, means for feeding the clip stock therefrom transversely of adjacent convolutions of the wire helix thus formed, means for severing the clip stock, means for forming U-shaped clips from the said severed portions, and means for clinching said clips to adjacent convolutions of the helix at predetermined circularly spaced locations.

15. In a machine of the character described, means for forming a wire helix, means for periodically imparting a fractional rotation to the helix, means supporting a supply of clip stock, means for severing said stock and forming clips therefrom, and means for securing respective clips to spaced pairs of individual convolutions of the wire helix at predetermined circularly spaced locations.

16. In a machine of the character described, means for feeding and forming wire stock into convolutions of a helix comprising feed wheels and forming rollers, guide means for maintaining adjacent convolutions of the wire helix in a predetermined side-by-side spaced relation, means for feeding clip stock transversely of said convolutions, means for severing portions of the clip stock, means for bending the severed portions to U-form with the legs thereof straddling adjacent convolutions of the helix, and means for clinching the legs of each clip about said straddled convolutions.

17. Apparatus of the character described comprising means for supporting an approximately circular bundle of wire, feed wheels for withdrawing wire stock therefrom, rollers for bending the wire thus withdrawn to arcuate form, a plurality of fixed arms to the outer portions of which are secured rotatable members adapted to accommodate the wire helix formed by the joint cooperation of the feed wheels and the bending rolls, means for periodically driving one of said members so as to intermittently rotate the wire helix thus formed a predetermined fraction of a revolution, means for supporting a supply of clip stock, means for severing short lengths of said stock, cooperating die elements for forming U-shaped clips from said severed lengths, and means for clinching the clips to spaced pairs of convolutions of the wire helix at predetermined spaced locations.

18. Apparatus of the character described comprising means for supporting an approximately circular bundle of wire, feed wheels for withdrawing wire stock therefrom, rollers for bending the wire thus withdrawn to arcuate form, a plurality of fixed arms to the outer portions of which are secured rotatable members adapted to accommodate the wire helix formed by the joint cooperation of the feed wheels and the bending rolls, means for periodically driving one of said members so as to intermittently rotate the wire helix thus formed a predetermined fraction of a revolution, means for supporting a supply of clip stock, means for severing short lengths of said stock, cooperating die elements for forming U-shaped clips from said severed lengths with depressed seats therein, pivoted guide fingers for maintaining proper spaced relation between adjacent convolutions of said helix to align the convolutions thereof with said seats in the clip, and means for bending the upper ends of said U-shaped clip inwardly to thus forcibly secure the convolutions of the helix within said seats of the clips.

19. In a machine of the character described, means rotatably supporting a supply of wire stock, means for coiling the same into a helix of large diameter, means for rotatably supporting a supply of clip stock, means for feeding the clip stock in a direction transverse to the convolutions of said helix, means for periodically severing the lengths of clip stock, means for forming U-shaped clips from the severed lengths with the legs thereof straddling adjacent convolutions of the helix, a plurality of guide fingers which normally project between the convolutions of the helix so as to align the same between the legs of the U-shaped clips, means pivotally mounting the fingers so as to permit them to swing out of the way of the attached clips when the helix is intermittently rotated, and yielding means normally holding the guide fingers in such position that they are in the path of movement of said clips.

20. In a machine of the character described, means for coiling wire into the form of a large diameter helix, a plurality of guide fingers which normally project between adjacent convolutions thereof, means for feeding clip stock transversely below two adjacent convolutions of the helix, means for severing a predetermined length of said clip stock, means for bending the extremities of said severed length of stock upwardly to form leg portions which straddle said two convolutions, said fingers being adapted to properly position the convolutions between the legs of said clip, means for clinching the legs of the clips to said convolutions, means for pivotally mounting said guide fingers in a manner to permit them to swing out of the way when contacted by previously applied clips upon partial rotation of the helix, and respective spring means normally positioning the fingers in the path of said clips.

CARL H. PETERSON.
WILLIAM V. MOREN.